United States Patent
Recknagel et al.

(10) Patent No.: US 7,167,807 B2
(45) Date of Patent: Jan. 23, 2007

(54) METHOD AND DEVICE FOR COLLISION RECOGNITION

(75) Inventors: Rolf-Juergen Recknagel, Jena (DE); Pascal Kocher, Ottrott (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/501,515

(22) PCT Filed: Feb. 14, 2003

(86) PCT No.: PCT/DE03/00451

§ 371 (c)(1),
(2), (4) Date: Jul. 14, 2004

(87) PCT Pub. No.: WO03/106225

PCT Pub. Date: Dec. 24, 2003

(65) Prior Publication Data

US 2005/0143960 A1    Jun. 30, 2005

(30) Foreign Application Priority Data

Jun. 13, 2002  (DE) .................... 102 26 260

(51) Int. Cl.
*G01L 1/00* (2006.01)
(52) U.S. Cl. ........................ 702/138; 701/45
(58) Field of Classification Search ............... 702/33, 702/116, 138–140, 188–190; 701/45–46; 340/436, 903; 180/271, 274; 280/733–735
See application file for complete search history.

(56) References Cited

U.S. PATENT DOCUMENTS

| 5,814,897 | A  | * | 9/1998 | Ito et al. .................... 307/10.1 |
| 6,236,308 | B1 | * | 5/2001 | Dalum ....................... 340/436 |
| 6,554,092 | B2 | * | 4/2003 | Midorikawa et al. ....... 180/268 |
| 6,626,463 | B1 | * | 9/2003 | Arima et al. ............... 280/806 |

FOREIGN PATENT DOCUMENTS

| DE | 44 24 551 A | 1/1996 |
| EP | 0 852 193 A | 7/1998 |
| WO | 99 42341 A  | 8/1999 |
| WO | 00 41918 A  | 7/2000 |
| WO | 02 16169 A  | 2/2002 |

* cited by examiner

*Primary Examiner*—Marc S. Hoff
*Assistant Examiner*—Mary Catherine Baran
(74) *Attorney, Agent, or Firm*—Michael J. Striker

(57) ABSTRACT

A method and an apparatus for collision detection are proposed, which serve to make faster plausibility checking of a collision signal possible. To that end, the unfiltered sensor signal is used, and this unfiltered sensor signal is compared with a plausibility threshold. Preferably as a function of the comparison of the unfiltered signal with the plausibility threshold, a plausibility flag is set. This plausibility flag can be maintained for a relatively long time by a hold element. As the sensor, an acceleration sensor can advantageously be used.

10 Claims, 1 Drawing Sheet

METHOD AND DEVICE FOR COLLISION RECOGNITION

PRIOR ART

The invention is based on a method and an apparatus for collision detection as generically defined by the preambles to the independent claims.

ADVANTAGES OF THE INVENTION

The method and apparatus of the invention for collision detection have the advantage that especially fast tripping times for the restraint means are made possible. This is especially highly advantageous in side collision sensors. Here, particularly by the use of the unfiltered sensor signal, fast plausibility check of the filtered tripping signal is made possible. The filtering for the signal to ascertain the collision is necessary to avoid so-called aliasing problems in the sampling. The low-pass-filtered signal is then evaluated by an electronic unit. The low-pass filtering delays the signal increase by valuable milliseconds, which do not occur when the unfiltered signal is evaluated. Since the unfiltered signal is used only for the sake of plausibility, the filtering for it can be dispensed with. A threshold need merely be exceeded. The sensor signal can be generated by an acceleration sensor, a pressure sensor, a temperature sensor, or other deformation sensors.

By the provisions and refinements recited in the dependent claims, advantageous improvements to the apparatus and method for collision detection recited in the independent claims are possible.

It is especially advantageous that exceeding the plausibility threshold sets a plausibility flag (flag). This is a marker or signal that indicates that the plausibility for collision has been recognized.

It is also advantageous that the plausibility flag is transmitted to a processor, where it is evaluated. The plausibility flag can advantageously be maintained for a predetermined length of time, in order to artificially prolong the duration of the flag, so that setting the plausibility flag only briefly is avoided. For this purpose, a hold element which is disposed downstream of the threshold value comparator for the plausibility threshold can advantageously be used. The threshold value comparator for the plausibility threshold can be embodied to be programmable, in order to adapt the plausibility threshold accordingly. The threshold value decider can be expanded with a view to requiring that the threshold be exceeded for a predetermined length of time before the plausibility flag is set. Brief spikes are thus prevented from leading to the plausibility check.

It is also advantageous that the housing of the sensor can be connected to a control unit, for instance via a two-wire line or a bus, and the control unit has a processor which evaluates the signals of the sensor, the low-pass-filtered signal, and the plausibility flag. The control unit itself can be connected to restraint means, so that in the event of a collision, the appropriate restraint means, such as air bags or seat belt tighteners, will be put into action. The filter and the threshold value comparator can be disposed in the housing of the sensor. For transmitting digital signals, the sensor advantageously has an analog/digital converter, which digitizes the plausibility check signal and the filtered sensor signals. This makes transmission of the data to the control unit as secure as possible.

Alternatively, it is possible for not only the sensor, the filtering, and the plausibility check but also the processor to be disposed in the same housing, making a complete control unit available.

DRAWING

Exemplary embodiments of the invention are shown in the drawing and will be explained in further detail in the ensuing description.

DESCRIPTION

At present, a side collision is sensed with the aid of acceleration sensors in the vicinity of the crash event in the B pillar of the seat cross member or the door sill, or with the aid of pressure sensors in the door. The tripping decision must additionally be confirmed by one further sensor, the plausibility sensor, if restraint systems are to be tripped. Typically, acceleration sensors are used as the plausibility sensors. These sensors can be built in, for instance in the central air bag tripper, mounted on the tunnel. The remote acceleration sensors used for side crash sensing can also be used as plausibility sensors.

It is problematic that these plausibility sensor concepts are too slow. The tripping decision is delayed by valuable milliseconds because of the wait for confirmation from the plausibility sensor. With a high-speed plausibility sensor, the full performance of side crash sensors or other crash sensors can be exploited. This is the case with indirect deformation sensors, such as pressure or temperature sensors, which can very quickly detect a side collision.

Figure 1:
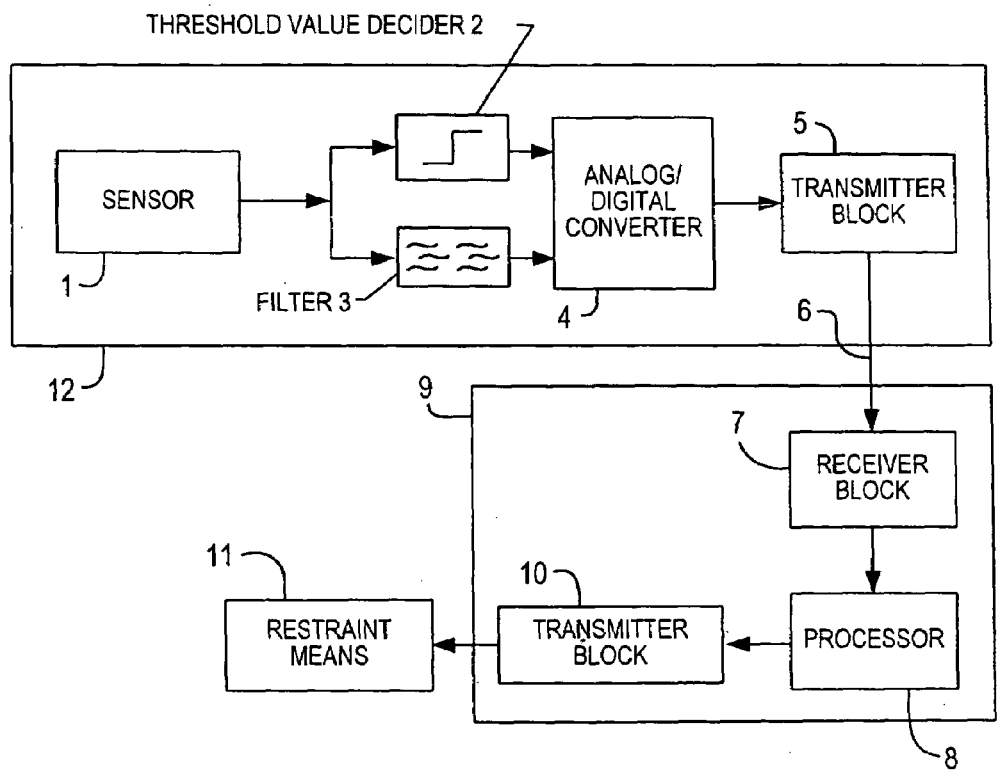
FIG. 1 is a block circuit diagram of the apparatus of the invention.

FIG. 1 shows the apparatus of the invention as a block circuit diagram. In a housing 12 of a sensor 1, the sensor 1 is connected via its output on the one hand to a low-pass filter 3 and a threshold value decider 2. The filter 3 is connected to a first input of an analog/digital converter 4, and the threshold value decider 2 is connected to the second input of the analog/digital converter 4. The analog/digital converter 4 is connected via its output to a transmitter block 5, which in turn is connected to a two-wire line 6, over which signals are transmitted to a receiver block 7 in a control unit 9. The data from the receiver block 7 are transmitted to a processor 8, which processes these data. The processor 8 is connected to a transmitter block 10, which in turn is connected to restraint means 11 via a two-wire line.

As noted above, an acceleration sensor, a pressure sensor, a temperature sensor, or other deformation sensors may be used as the sensor 1. The output signal of the sensor 1 is transmitted unfiltered to a low-pass filter 3 and to a threshold value decider 2. The threshold value decider 2 compares the unfiltered signal with a predetermined threshold, which can be input at the threshold value decider 2. It is possible for this threshold to be adaptively tracked as a function of the raw data signal. If the unfiltered signal exceeds the threshold predetermined in the threshold value decider 2, then the threshold value decider 2 sets a plausibility flag, which is transmitted to the analog/digital converter 4. The analog/digital converter 4 has a multiplexer, which [verb missing] the digitized signals, which the analog/digital converter 4 generates from the filtered signals from the low-pass filter 3, and the plausibility flag to a data stream, which is transmitted to a transmitter block 5, which transmits this data stream, via the two-wire line 6, to the receiver block 7 in the control unit 9. A current interface is employed here as the transmission principle. However, current width modulation or voltage pulses or radio or light transmissions are also possible. A bus connection is also possible between the control unit 9 and the sensor housing 12. In that case, the transmitter block 5 and the receiver block 7 would be embodied as bus controllers.

In the two-wire line 6 shown here, a direct current is transmitted from the control unit 9 to the transmitter block 5, at which the signals that are to be transmitted from the sensor 12 to the control unit 9 are modulated. A kind of power line transmission thus prevails. The receiver block 7 then transmits the received data stream to the processor 8. The processor 8 evaluates both the plausibility flag and the filtered data from the sensor 1. On the basis of the plausibility flag, the processor 8 recognizes whether it can be suspected that a crash is present, or not. Optionally, a further plausibility check can also be provided in the control unit 9. The plausibility flag and the digitized filtered signals are provided in a predetermined frame format for transmission.

To maintain the plausibility flag longer, the threshold value decider 2 has a hold element, for prolonging the holding time of the plausibility flag.

Alternatively, it is possible for the filtering, digitizing and processing to be done in the control unit 9, if there is at least one sensor in the control unit as well. However, it is also possible for all the elements to be accommodated in the housing 12, in that case making a complete control unit available. In this case, the housing 12 would be connected merely to the restraint means 11.

Figure 2:
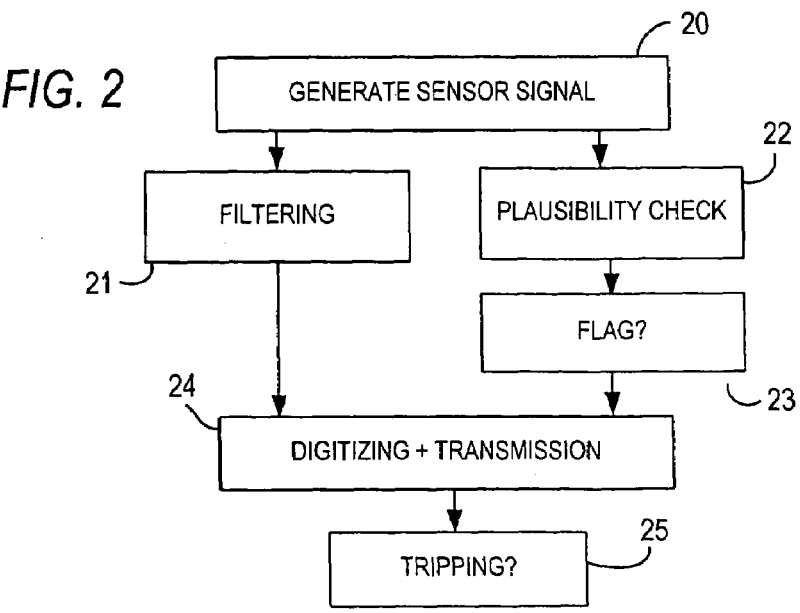
FIG. 2 is a flow chart of the method of the invention.

FIG. 2 shows the method of the invention as a flow chart. In method step 20, the sensor signal is generated by the sensor 1. This sensor signal is on the one hand, in method step 21, filtered and on the other, in method step 22, checked for plausibility using the threshold value decider 2. If the threshold has been exceeded, then in method step 23 the flag for the plausibility check is set. In method step 24, the digitizing of the filtered signals and their transmission and combination with the plausibility flag over the line 6 to the control unit 9 are then effected. On the basis of the filtered signals and the plausibility flag from a plurality of sensors, the processor 8 recognizes in method step 25 whether tripping of the restraint means 11 should occur.

The plausibility check signal, that is, the plausibility flag and the digitized data, can also be transmitted simultaneously, for instance by a space multiplex, frequency multiplex or, as described above, time multiplex process.

The invention claimed is:

1. A method for collision detection, comprising the following steps:
   providing a sensor;
   connecting an output of the sensor to a threshold value decider;
   transmitting an unfiltered output signal of the sensor (1) directly to a low pass filter and directly to the threshold value decider;
   comparing the unfiltered signal without a wavelet transformation with a predetermined plausibility threshold; and
   detecting a collision on the basis of the comparison and of the filtered signal.

2. The method of claim 1, wherein if the plausibility threshold is exceeded, a plausibility flag is set.

3. The method of claim 2, wherein the plausibility flag is transmitted to a processor (8).

4. The method of claim 2, wherein the plausibility flag is maintained for a predetermined length of time.

5. An apparatus for collision detection, comprising:
   a sensor for outputting a signal;
   a filter (3) that filters the signal, to which the sensor is directly connected;
   a threshold value decider (2) for the unfiltered signal, to which the sensor is directly connected, so that the unfiltered signal is compared with a predetermined plausibility threshold without a wavelet transformation; and
   a processor (8), wherein the processor detects a collision as a function of the comparison and of the filtered signal.

6. The apparatus of claim 5, wherein the threshold value decider (2) is connected at its output to a hold element in such a way that the hold element keeps the output signal for a predetermined length of time.

7. The apparatus of claim 5, wherein the sensor (1) can be connected to a control unit (9), and the control unit (9) has the processor (8) and can be connected to restraint means (11).

8. The apparatus of claim 7, wherein the filter (3) and the hold element are disposed in the control unit (9).

9. The apparatus of claim 7, wherein the filter (3), the hold element, and a device for analog/digital conversion are disposed in a housing (12) together with the sensor (1).

10. The apparatus of claim 5, wherein the sensor (1) is embodied as an acceleration sensor.

* * * * *